(No Model.)
J. CHURCHWARD.
APPARATUS FOR MANUFACTURING RAILWAY TIE PLATES.
No. 468,928. Patented Feb. 16, 1892.
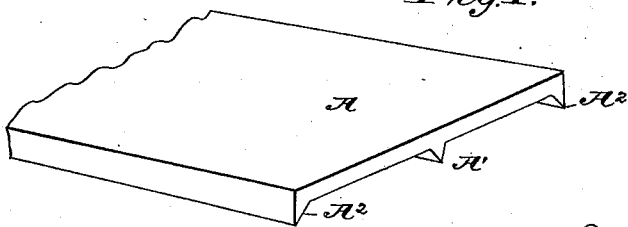
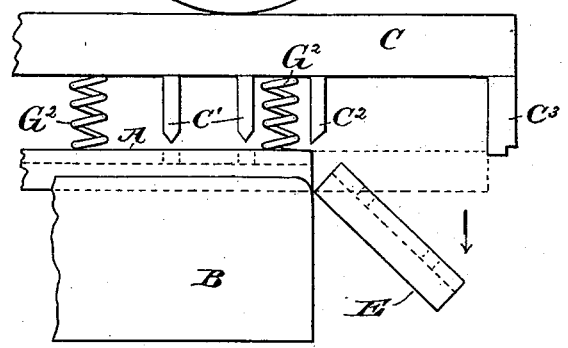
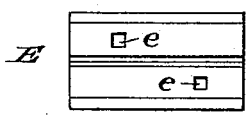
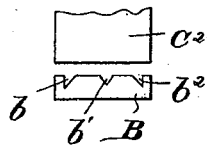
Attest:
C. W. Benjamin,
N. V. Brown
James Churchward
Inventor

UNITED STATES PATENT OFFICE.

JAMES CHURCHWARD, OF BROOKLYN, NEW YORK, ASSIGNOR TO THE Q. & C. COMPANY, OF CHICAGO, ILLINOIS, AND NEW YORK, N. Y.

APPARATUS FOR MANUFACTURING RAILWAY-TIE PLATES.

SPECIFICATION forming part of Letters Patent No. 468,928, dated February 16, 1892.

Original application filed June 30, 1891, Serial No. 397,959. Divided and this application filed December 2, 1891. Serial No. 413,778. (No model.)

*To all whom it may concern:*

Be it known that I, JAMES CHURCHWARD, a subject of the Queen of Great Britain, and a resident of Brooklyn, county of Kings, State of New York, have invented new and useful Improvements in Apparatus for Manufacturing Railway-Tie Plates, of which the following is a specification.

My invention relates to the manufacture of railway-tie plates—that is, metal plates intervening the ties and the bases of the rails and secured to the same, respectively, and serving to prevent injury to the ties from the pounding of the rolling stock upon the rails, as well as to prevent the rails from creeping; and its object is to provide an apparatus for simultaneously punching and shearing the metal sheet produced by the apparatus forming the subject of an application filed by me on the 30th day of June, 1891, Serial No. 397,959, and of which application this is a division.

The invention consists in the construction and combination of parts, as hereinafter described and claimed, reference being had to the accompanying drawings, forming a part of this specification, and in which similar letters of reference designate corresponding parts in the several views.

Figure 1 is a broken perspective view of the metal sheet produced by the apparatus set out in my aforesaid application. Fig. 2 is a broken side elevation of the apparatus embodying the present invention, and Fig. 3 is a broken end view of part of the same, and Fig. 4 is a plan view of the finished plate.

The sheet of metal A (shown in part in Fig. 1) has a flat upper surface, while its under surface has formed at its center a V-shaped flange A' and at its side edges downwardly and outwardly tapering flanges $A^2$. The punching and shearing apparatus is shown in Figs. 2 and 3, and consists of a shear B, formed with a central longitudinal V-shaped groove $b'$ and downwardly-tapering grooves $b$ and $b^2$, parallel with the central groove, to receive the flanges of the sheet A, and a bar C, carrying punches C' C', which in this instance are square in cross-section and out of alignment, and next said punches a shear $C^2$, while at the outer end of said bar is formed a stop $C^3$. The shear B and the bar C may be placed the one below the other, as shown in the drawings, or one at one side of the other, as may be found most desirable in practice. The shear B is stationary, so as to afford a substantial support for the sheet of metal to be operated upon, while the bar C is connected in any suitable manner with any preferred form of actuating mechanism—as, for instance, that illustrated in Fig. 2, wherein G is a cam-lever pivoted at G' at a suitable point above the bar C, and which, as its handle is raised, bears with its cam-face on the bar C and forces it downward, the return upward movement of said bar being assured by spiral springs $G^2$, affixed at one end to the bar C and bearing between said bar and the sheet A. It will be understood, however, that the means for reciprocating the bar C may be of any other well-known and suitable form, as may be found desirable in practice.

The metal sheet A is placed in position upon the shear B, whereupon the bar C is reciprocated, the punches C', as the bar descends, piercing the metal sheet and producing spike-apertures, such for instance, as shown at $e$ in Fig. 4. The sheet is then moved outwardly upon the shear B until its end abuts against the stop $C^3$ on the bar C, it being understood that said stop is located at such distance from the shear $C^2$ as the desired length of the finished tie-plates may require. At the next descent of the bar C the shears $C^2$ and B cut off from the sheet A the finished plate E, as shown at the right hand in Fig. 2, and the punches C' simultaneously pierce the spike-apertures $e$ in the next length of the sheet A, and so on until the sheet is used up.

I desire it to be understood that I do not limit myself to any particular cross-sectional form of the punches, as they may be square, round, oblong, or of any other shape dependent upon the contour of the spikes to be employed in connection with the tie-plates, and I have shown square punches and spike-apertures only as an example. It is also to be understood that while I have shown the spike-apertures as out of alignment and have described the punches as similarly disposed, I do not limit myself to such relation of the punches and apertures, as the punches may be arranged so as to produce aligning spike-apertures, if desired.

Having thus fully described my invention, what I claim, and desire to secure by Letters Patent, is—

1. In apparatus for manufacturing railway-tie plates of the character specified, a fixed shear formed with grooves to receive the flanges of the tie-plate, and a reciprocable bar carrying punches and a shear and provided at its outer end with a stop for the tie-plate, substantially as shown and described.

2. In apparatus for manufacturing railway-tie plates of the character specified, the combination, with a fixed shear formed with a longitudinal central groove and side grooves parallel therewith, said grooves being adapted to receive the flanges of the tie-plate, of a reciprocable bar carrying punches and a shear and formed at its outer end with a depending stop adapted to be abutted upon by the tie-plate, and means for reciprocating said bar, substantially as shown and described, for the purpose specified.

In testimony that I claim the foregoing as my invention I have signed my name, in presence of two witnesses, this 28th day of November, 1891.

JAMES CHURCHWARD.

Witnesses:
M. V. CRONIN,
A. B. CHOBOT.